(12) United States Patent
Grimsrud (10) Patent No.: US 6,347,370 B1
(45) Date of Patent: Feb. 12, 2002

(54) METHOD AND SYSTEM FOR PRE-LOADING SYSTEM RESUME OPERATION DATA ON SUSPEND OPERATION

(75) Inventor: Knut Stener Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/224,212

(22) Filed: Dec. 30, 1998

(51) Int. Cl.[7] .............................................. G06F 9/445
(52) U.S. Cl. .......................................... 713/1; 713/323
(58) Field of Search ........................... 713/1, 320, 323, 713/330

(56) References Cited

U.S. PATENT DOCUMENTS

| 5,787,296 A | 7/1998 | Grimsrud et al. |
| 5,802,593 A | 9/1998 | Grimsrud |
| 5,890,205 A | 3/1999 | Grimsrud et al. |
| 5,920,896 A | 7/1999 | Grimsrud et al. |

OTHER PUBLICATIONS

Knut Grimsrud, *"Rank Disk" Performance Analysis Tool*, White Paper, Intel Corporation Aug. 29, 1995, Rev. 5, Sep., 1997, pp. 1–4.

Knut Grimsrud, *"Analyze Disk" Performance Analysis Tool*, White Paper, Intel Corporation. Aug. 15, 1995, Rev. 7 Jul. 1997, pp. 1–11.

*Primary Examiner*—Thomas M. Heckler
(74) *Attorney, Agent, or Firm*—Kenyon & Kenyon (57) ABSTRACT

A method is disclosed for expediting the resume operation of a computer system. Before the system enters a suspend state, the disk data which is likely to be needed by the computer system during the resume operation is pre-loaded from the disk. The system determines which disk data is needed during previous resume operations. The data pre-loaded from the disk may be loaded into a cache utilized by the input/output ("I/O") system.

23 Claims, 5 Drawing Sheets

RESUME TABLE, BY FILE/OFFSET

| FILE | START BYTE OFFSET | BYTE LENGTH | ACCESS INDEX NUMBER |
|---|---|---|---|
| MMDEVLDR.VXD | 4096 | 4096 | 1 |
| MMDEVLDR.VXD | 8192 | 4096 | 5 |
| SB16.VXD | 12288 | 57344 | 2 |
| SB16.VXD | 81920 | 24576 | 1 |
| SYSTEM <DIR> | 12288 | 4096 | 1 |
| DSOUND.VXD | 8192 | 4096 | 7 |
| SB16SND.DRV | 57344 | 4096 | 1 |

FIG. 5

RESUME TABLE, BY SECTOR

| START SECTOR | NUMBER OF SECTORS | ACCESS INDEX NUMBER |
|---|---|---|
| 1069775 | 8 | 1 |
| 1069783 | 8 | 5 |
| 294351 | 112 | 2 |
| 294487 | 48 | 1 |
| 89871 | 8 | 1 |
| 1068855 | 8 | 7 |
| 262751 | 8 | 1 |

FIG. 6

METHOD AND SYSTEM FOR PRE-LOADING SYSTEM RESUME OPERATION DATA ON SUSPEND OPERATION

BACKGROUND OF THE INVENTION

1. Field of the Invention

The present invention relates to the field of computer systems. More specifically, the present invention relates to system suspend and resume methodology and applications.

2. Background Information

Hard disk drive spinup time may significantly increase microprocessor based system resume time. In recent years, the performance of personal computer systems has increased dramatically. Processor performance has increased from a typical speed of 16 MHz to a typical speed of over 200 MHz. While the performance of the microprocessor and other components of personal computer systems has improved dramatically, the performance improvements of certain components have not kept pace; in particular, hard disk drives are often one element of such systems that may degrade overall system performance.

Because of their mechanical design, hard disk dries are typically one of the primary contributors in increasing the time required for a system to resume from a suspend state when power conservation methods are implemented. In order to lower power consumption, in particular in order to comply with developing regulatory standards, systems are designed to enter a suspend state if no user or other activity is detected for a certain amount of time, or through other methods, for example, by a user command such as the "Suspend" menu command available in the Windows 95® operating system. Among suspend methods, the two commonly used are "suspend to RAM" and "suspend to disk." When used herein, "suspend" will refer to suspend to RAM and not to suspend to disk. Suspend to disk requires the state of the computer system, including much of the information stored in random access memory ("RAM"), to be saved to the hard disk drive. During suspend to RAM the state of the processor and the operating system ("OS") is saved to a region of RAM, system components power down or enter a suspend state, and the RAM is operated in a low power mode with periodic refreshes, retaining the information it stores.

When the system suspends, applications are notified, peripheral devices are powered down, and the processor is suspended. The state of the system—e.g. software and data which are in memory—is not lost, as the system RAM is not powered down. When user or other activity is detected, or an internal event such as a timer expiration occurs, the processor and peripherals are activated, and applications resume their execution. A user reactivating the system may expect that the system function with a "consumer electronics feel", where the system responds to the user input virtually immediately instead of after a delay. In addition, the activity causing the resume operation may be an external event to which the system must respond within a certain amount of time, such as an external telephone call for a facsimile or modem transmission where the calling party or device may hang up if a response is not detected after a certain number of rings.

During the resume operation the operating system ("OS"), peripherals, applications, or other system components may require information, such as instructions and data, which are normally stored on the hard disk drive. During the suspend state, the hard disk drive stops rotating its disk or disks. During a resume operation it may typically take 10 to 15 seconds for the disk(s) to attain their operational rotational speed; on certain systems this time may be as long as 30 seconds. Thus certain resume data may typically only be available to system components 10 to 15 seconds after the resume operation commences. This does not allow for the system to have the same feel as other consumer electronic devices, and prevents the system from reacting to certain resume activity, such as a facsimile or modem incoming telephone call within a required amount of time.

Thus, improved performance during a resume operation is desirable, and as will be disclosed in more detail below, the present invention provides the improvement in performance as well as other desirable results, which will be readily apparent to those skilled in the art, upon reading the detailed description to follow.

SUMMARY OF THE INVENTION

A method is disclosed for expediting the resume operation of a computer system. Before the system enters a suspend state, the disk data which is likely to be needed by the computer system during the resume operation is pre-loaded from the disk. The system determines which disk data is needed during previous resume operations. The data pre-loaded from the disk may be loaded into a cache utilized by the input/output ("I/O") system.

DETAILED DESCRIPTION

1. Overview

Certain computer systems may execute a suspend operation to enter a suspend state, then execute a resume operation to continue normal operations. At the start of a resume operation the hard disk drive is not rotating its disk(s); the disk(s) will not attain operational speed for a certain amount of time. Thus data and instructions required for resume operations will be accessible much faster if stored in a cache instead of on the hard disk drive. In an exemplary embodiment of the present invention, the resume acceleration module expedites the resume operation of a computer system by ensuring that data and instructions stored on the hard disk drive and required for the resume operation are available in a cache immediately at the start of a resume operation. In an exemplary embodiment of the present invention, the resume acceleration module causes to be stored in an I/O cache, just before a suspend operation, the data and instructions most likely to be needed on the resume operation. In pre-loading the data, the module references a resume table, which stores a set of references to disk accesses which are most likely to be made during a resume operation. The table is filled by a training submodule, which is active on prior resume operations to determine which instructions and data are likely to be needed by the computer system during a resume operation.

Figure 1:
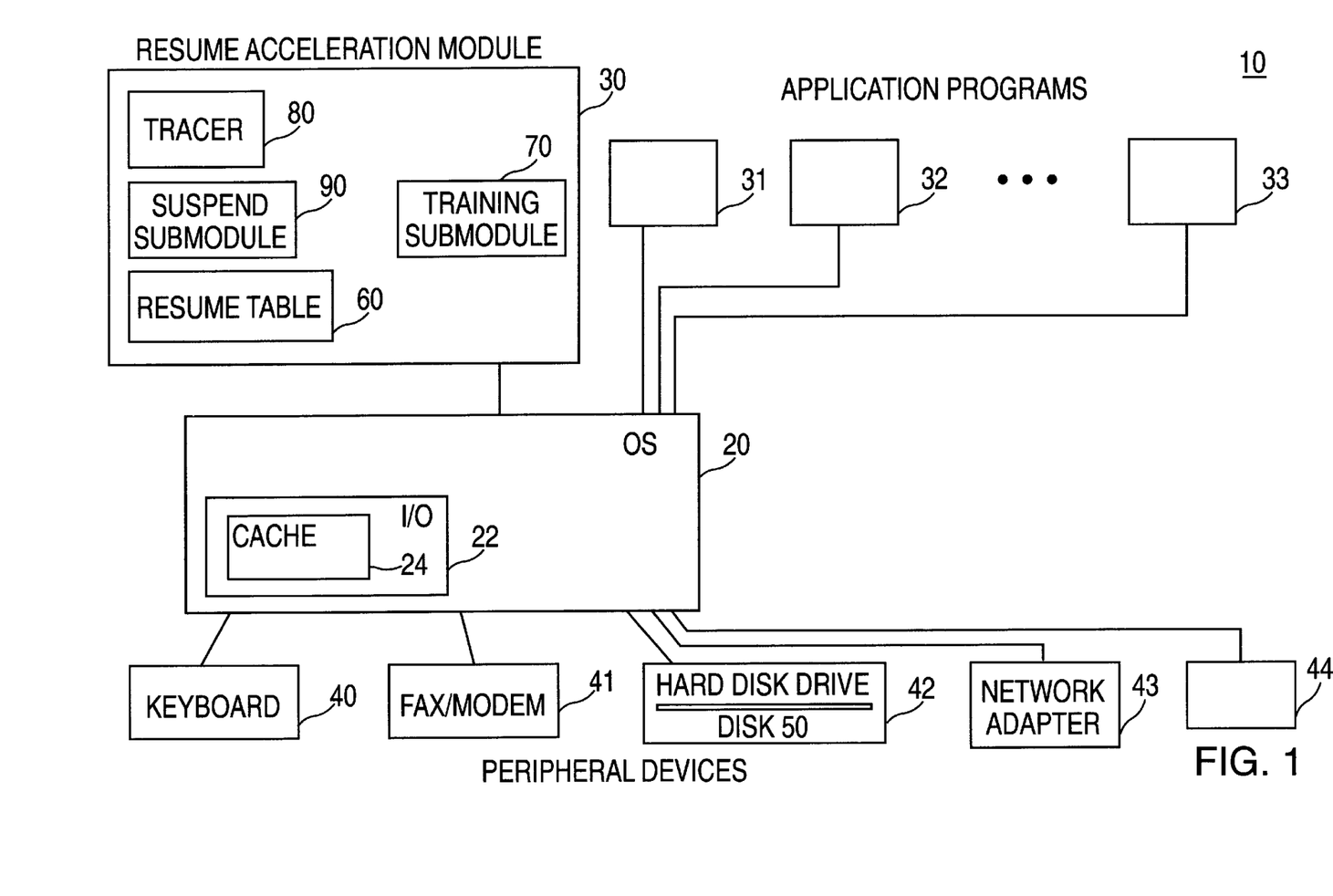
FIG. 1 is a block diagram illustrating a computer system according to an embodiment of the present invention.

Referring to the figures in which like numerals indicate like elements, FIG. 1 is a block diagram illustrating a computer system according to an embodiment of the present invention. Computer system 10 of FIG. 1 includes a resume acceleration module 30 for speeding resume operations of computer system 10, an OS 20 for providing overall control of computer system 10, several applications programs 31–33 and a plurality of peripheral devices 40–44. Peripheral devices 40–44 include a keyboard 40, a facsimile/modem connection 41, a hard disk drive 42, a network adapter 43 and other peripheral devices 44, etc. Hard disk drive 42 contains at least one disk 50 and organizes data into a plurality of disk files.

Computer system 10 may operate in a normal mode or be placed in one or more suspend states. Computer system 10 may execute a suspend operation to enter a suspend state, then execute a resume operation to continue normal operations. In an exemplary embodiment of the present invention, resume acceleration module 30 operates to speed resume operations of computer system 10 by pre-loading into cache 24 disk regions likely to be needed during resume operations. Cache 24 may also be referred to as a "file system cache"; it will be referred to herein as a cache.

Resume acceleration module 30 includes a training submodule 70 for compiling, during resume operations, a list of references to disk accesses likely to be needed on future resume operations. Resume acceleration module 30 also includes a resume table 60 for storing the list of references, a tracer 80 for recording references to disk accesses made during resume operations, and a suspend submodule 90 for causing the data corresponding to the disk accesses references in resume table 60 to be loaded into cache 24 just prior to a suspend operation.

OS 20 includes an I/O module 22 for performing I/O operations. I/O module 22 utilizes cache 24, which provides high speed temporary storage of currently active disk drive regions.

Resume acceleration module 30 ensures that data and instructions stored on hard disk drive 42 and required at the start of a resume operation are available immediately at the start of a resume operation. At the start of a resume operation hard disk drive 42 is not rotating disk 50, and disk 50 will not attain its operational speed for a certain amount of time; due to this delay data and instructions required for resume operations will be accessible much faster if stored in cache 24 instead of on hard disk drive 42. In an exemplary embodiment of the present invention, resume acceleration module 30 causes to be stored, just before a suspend operation, the data and instructions most likely to be needed on the resume operation in cache 24 of I/O module 22. Resume table 60 of the resume acceleration module 30 stores a set of references to disk accesses which are most likely to be made during a resume operation by computer system 10. Resume table 60 is filled during the course of a number of resume operations by training submodule 70 of resume acceleration module 30. Training submodule 70, over a series of resume operations, stores in resume table 60 the requests that have been made most often in past resume operations and which are thus most likely to be made in future resume operations. In an exemplary embodiment tracer 80 receives disk access information from OS 20, and passes the disk access information to training submodule 70 which records the information, in the form of references to disk accesses.

OS 20 manages the operation of computer system 10, provides I/O services to applications 30–33, and in addition provides event notification services. OS 20 provides I/O services using I/O module 22, allowing data to be read from and written to peripheral devices 40–44. Cache 24 provides high speed temporary storage of currently active disk drive regions. As part of its normal operation, I/O module 22 of OS 20 saves the data retrieved by the most recent hard disk drive accesses in cache 24.

Figure 2:
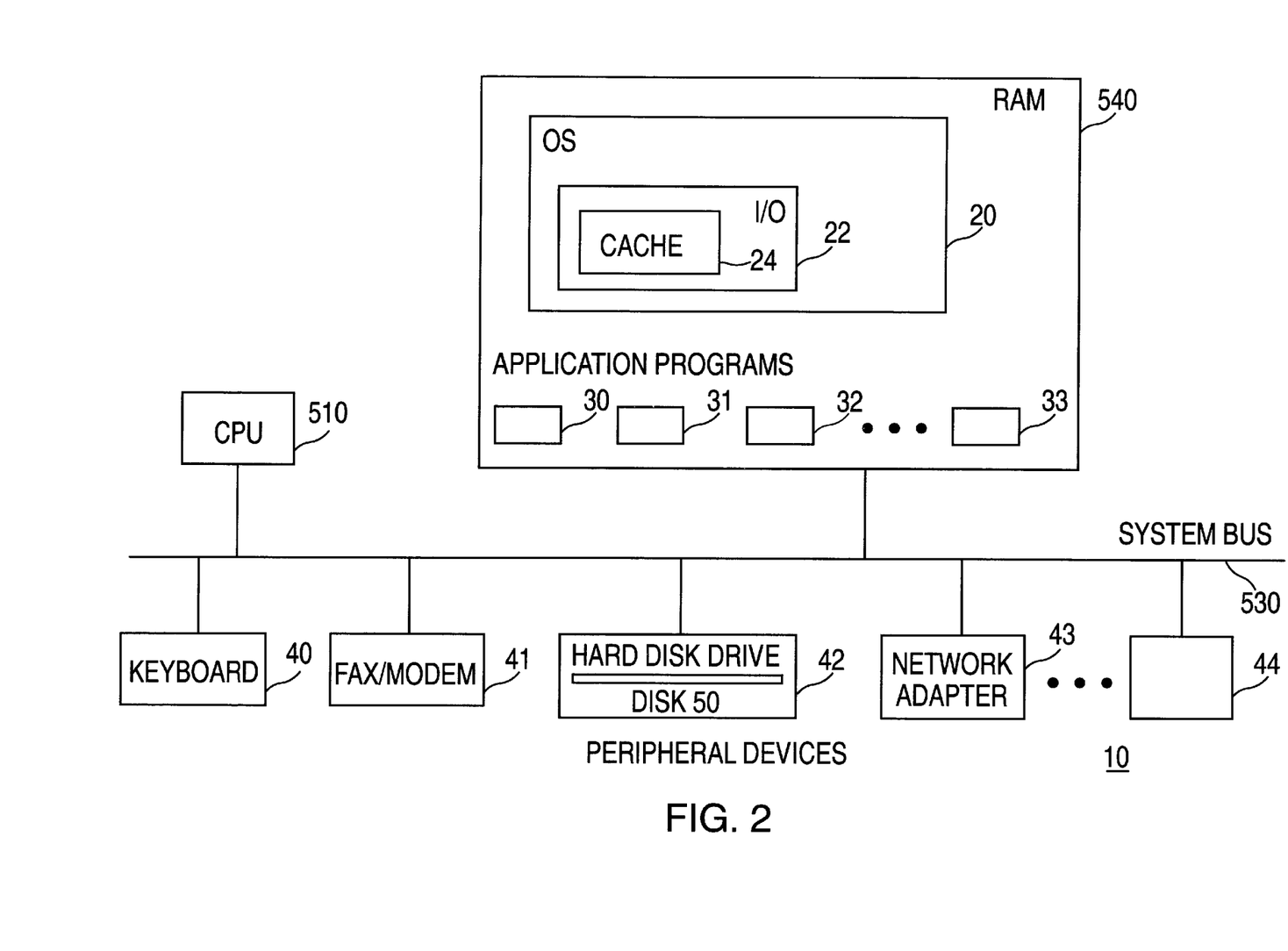
FIG. 2 is a block diagram illustrating the computer system in FIG. 1 according to an embodiment of the present invention.

FIG. 2 is a block diagram illustrating computer system 10 of FIG. 1 according to an embodiment of the present invention. Computer system 10 may be a standard personal computer or another type of data processing device, and in addition, may include components not traditionally found in a standard personal computer. Computer system 10 includes a central processing unit ("CPU") 510 connected to a system bus. CPU 510 executes instructions and controls the operation of computer system 10. CPU 510 may be, for example, a Pentium® processor available from Intel® (Corp. System bus 530 allows the various components of computer system 10 to communicate, and may alternatively include a plurality of busses or a combination of busses and bus bridge circuits.

Computer system 10 further includes RAM 540, providing non-permanent storage of data and program instructions, and a plurality of peripheral devices 40–44, including keyboard 40, facsimile/modem connection 41 and hard disk drive 42. Peripheral devices 40–44 may include other devices not shown, such as a monitor/display device. A portion of application programs 30–33, resume acceleration module 30, and OS 20 (including I/O module 22) are stored in RAM 540, are executed by CPU 510, and to an extent control the operation of computer system 10 in cooperation with other components such as CPU 510 and OS 20. According to an embodiment of the present invention, cache 24 is located in RAM 540.

In an exemplary embodiment of the present invention, OS 20 may determine that the computer should enter a suspend state. This may be done for any number of reasons—for instance, OS 20 may determine that none of applications 30–33 or peripheral devices 40–44 has been active for a specified amount of time, and that the computer should thus enter a suspend state to save power.

According to an embodiment of the present invention, to effect a suspend operation OS 20 sends a WM_POWERBROADCAST message to all applications 30–33 with PBP_APMQUERYSUSPEND as one field, requesting permission to enter a suspend state. After receiving permission from all applications 30–33 OS 20 suspends operation of computer system 10; CPU 510 powers down peripheral devices 40–44 and CPU 510 enters a suspend state. When CPU 510 enters a suspend state applications 30–33 cease to operate, as they operate via the operation of CPU 510. RAM 540 does not power down; while computer system 10 is in suspend state, RAM 540 retains all the information which it stores. Hard disk drive 42 continually rotates disk 50 as part of its normal operation. As part of the power down of peripheral devices 40–44, hard disk drive 42 stops rotating disk 50. It should be noted that the present invention may be utilized with any system having suspend and resume capabilities, including systems not using the specific suspend and resume techniques described here.

According to an embodiment of the present invention, an external event, or an internal event such as a timer expiration, causes computer system 10 to exit the suspend state through the use of a resume operation. Such an event might, for example, be the user typing at keyboard 40 or an incoming telephone call at facsimile/modem connection 41.

CPU 510 exits the suspend state and resumes the operation of computer system 10. OS 20 then issues a WM_POWERBROADCAST message to applications 30–33 with PBP_APMRESUMESUSPEND message as one field. Applications 30–33 resume their operations, and OS 20 resumes and reinitializes peripheral devices 40–44. In order to re-initialize certain of peripheral devices 40–44 OS 20 requires data and instructions normally stored on hard disk drive 42. Thus during a resume operation OS 20 makes certain hard disk drive requests for the required data and instructions. In addition application programs 30–33 and other system components may require data and instructions stored on hard disk drive 42 as part of their resume procedure. Since hard disk drive 42 is not rotating disk 50 at the start of a resume operation, these requests cannot be filled until hard disk drive 42 rotates disk 50 at its operational speed. This may result in a significant system delay.

2. Suspend Submodule

The operation of suspend submodule 90 (FIG. 1) of resume acceleration module 30 according to an exemplary embodiment of the present invention will now be described. Suspend submodule 90 operates during a suspend operation to ensure that data and instructions required by system components in a subsequent resume operation will be quickly available at the start of the resume operation.

In an exemplary embodiment, resume table 60 of resume acceleration module 30 stores a set of references to disk accesses which are typically requested by OS 20 and application programs 30–33 during a resume operation. The set of disk access references in resume table 60 will be particular to the individual system on which resume acceleration module 30 is installed. Since each time computer system 10 resumes the resume operation may involve different events and applications and thus different specific resume data and instructions, different disk accesses may be required on each resume. However, the typical system configuration will not change significantly over time. Therefore on each individual system certain data and instructions are commonly required on resume operations, and are thus more likely than other data and instructions stored on hard disk drive 42 to be requested during a resume operation on that individual system.

When resume acceleration module 30 is loaded into RAM 540 on system startup, the latest version of resume table 60 may be loaded into RAM 540 from hard disk drive 42, or may be loaded at a later point. Resume acceleration module 30, including resume table 60, may be paged out of RAM 540 during the operation of computer system 10, but will be loaded back to RAM 540 as resume acceleration module 30 or its components are needed.

Since at the start of a resume operation hard disk drive 42 is not rotating disk 50, and will not achieve its operational speed for a certain amount of time (e.g., in the system for which the exemplary embodiment is designed, for approximately 10–15 seconds), resume data and instructions stored on hard disk drive 42 will not be available for that amount of time. Information in cache 24, which is stored in RAM 540, will, however, be available virtually immediately at the start of a resume operation. The system of the present invention speeds the resume operation by decreasing access time to data and instructions required for the resume operation; in an exemplary embodiment this is achieved by storing, just before a suspend operation, the data and instructions most likely to be needed on the resume operation in cache 24, maintained by I/O module 22. Among the data and instructions being stored in cache 24 may be portions of resume acceleration module 60 itself. A technique according to an embodiment of the present invention for storing this information prior to suspend will now be described.

In an exemplary embodiment of the present invention, resume table 60 of the resume acceleration module 30 stores a set of references to disk accesses which are most likely to be made during a resume operation by computer system 10. In an exemplary embodiment, resume table 60 is filled or generated during the course of a number of resume operations by training submodule 70 of resume acceleration module 30, described below. On each resume operation it is possible that only a subset of the references to disk accesses in resume table 60 will be needed. In addition, while on a typical system the set of resume disk requests will usually not vary over time, some resume operations may require disk accesses which are not in resume table 60. In such a case these disk accesses will be added to resume table 60 by training submodule 70.

Figure 3:
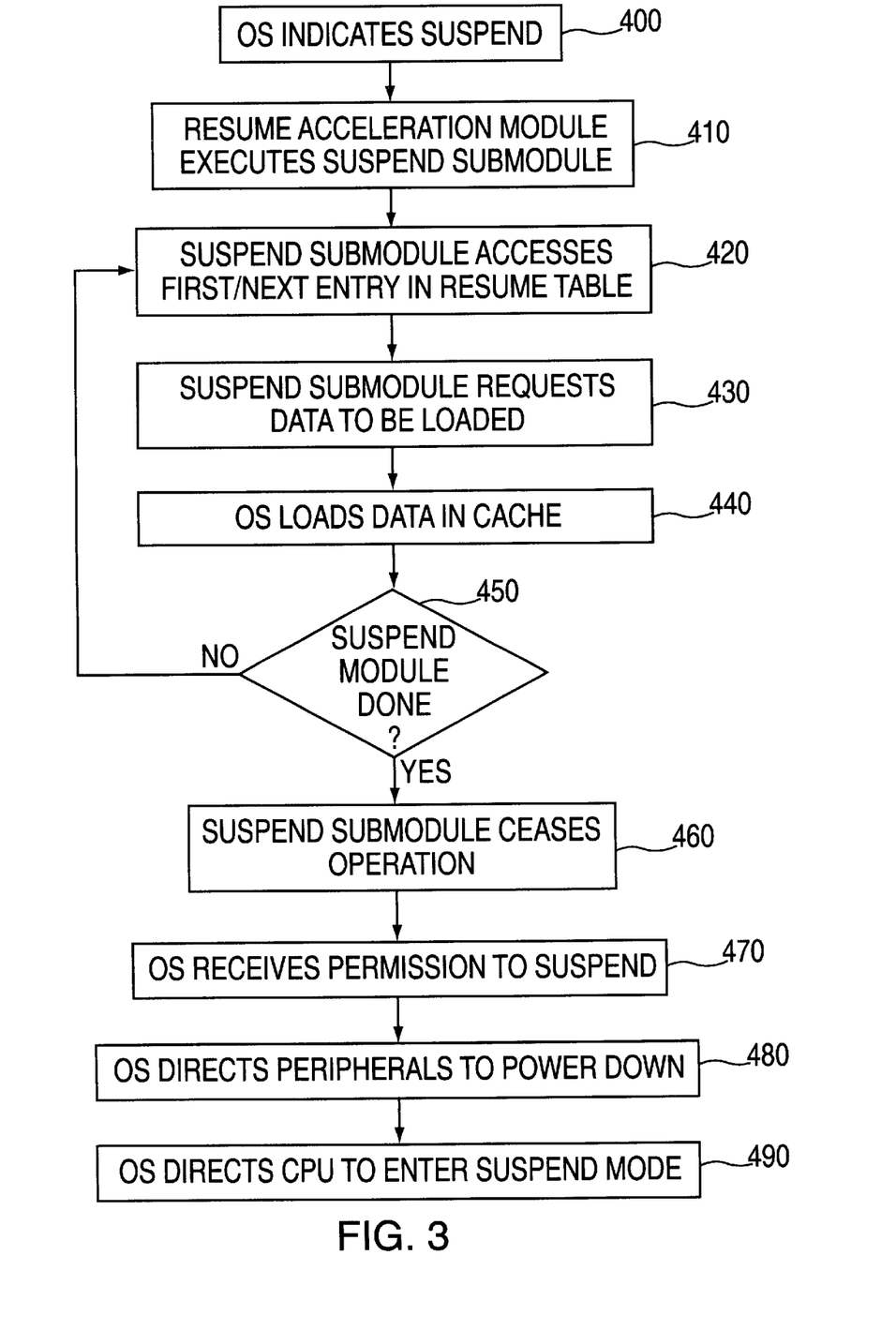
FIG. 3 is a flow chart illustrating the operation of the suspend submodule of FIG. 1 according to an embodiment of the present invention.

FIG. 3 is a flow chart illustrating the operation of suspend submodule 90 of FIG. 1 according to an embodiment of the present invention.

Referring to FIG. 3, in step 400, OS 20 indicates to applications 30–33 and other system components a suspend is imminent. This may occur, for example, as a result of a determination by OS 20 that there has been a certain period of inactivity, or as a result of a user command. This may be done, for example, by a WM_POWERBROADCAST message to all applications 30–33 with PBP_APMQUERYSUSPEND as one field, requesting permission to enter a suspend state. Other techniques can be used to initiate a suspend operation. On receipt of this message, resume acceleration module 30, in step 410, causes suspend submodule 90 to be executed.

In step 420, suspend submodule 90 accesses resume table 60; suspend submodule 90 begins reading resume table 60 with the first entry in the table and incrementally steps through the table. Note that it is not necessary that suspend submodule 90 access resume table 60 incrementally or in any particular order.

In step 430, suspend submodule 90 requests that OS 20 load the disk region referenced by a particular disk access reference in resume table 60 into cache 24. This request will be made by suspend submodule 90 simply making a normal disk load request to OS 20, based on the reference in resume table 60.

In step 440 the disk access requested by suspend submodule 90 causes the data requested (data and instructions corresponding to resume operations) to be stored in cache 24 by I/O module 22 of OS 20. Among the data and instructions being stored in cache 24 may be portions of resume acceleration module 60 itself. In one embodiment, cache 24 operates in a "least recently used" manner: when a new page of data is to be added to cache 24 because of a new disk access, the last page in time added to cache 24 is retired to hard disk drive 42. Since the hard disk drive accesses made by suspend submodule 90 will occur just before a suspend operation, the disk data stored in cache 24 will not be displaced as a result of any subsequent disk requests, will remain in cache 24 during the suspend state, and will be available in cache 24 at the point in time the subsequent resume operation commences. In one embodiment, cache 24 exists in RAM 540, which is not powered down during a suspend operation; thus the disk data in cache 24 is intact at the start of a subsequent resume operation. In this manner an exemplary embodiment of the present invention leverages off of already existing modules.

In step 450, suspend submodule 90 determines if it has processed all disk access references stored in resume table 60. If there are still access references remaining, suspend submodule 90 continues at step 420. If there are no access references remaining, suspend submodule 90 ceases operation in step 460.

In step 470, OS 20 receives permission from applications 30–33 to suspend operations. In other embodiments, different suspend methods may be used, which do not include OS asking and receiving permission to suspend.

In step 480, CPU 510 powers down peripheral devices 40–44. In step 490, OS 20 directs that CPU 510 enter a suspend state. When CPU 510 enters a suspend state applications 30–33 cease to operate, as they operate via the operation of CPU 510. In alternative embodiments, system components other than OS 20 may direct or be involved in the suspend sequence, and different methods may be used to effectuate a suspend operation or a resume operation.

Through the operation of suspend submodule 90, described above, the resume speed of computer system 10 on a subsequent resume operation will be greatly improved. As discussed below in greater detail, an external event, or an internal event such as a timer expiration, will cause the computer to exit the suspend state through the use of a resume operation. Some resuming components will require data and instructions which are normally stored on hard disk drive 42, and will thus require hard disk access. Due to the function of suspend submodule 90 a set of data and instructions likely to be requested by OS 20 and applications 30–33 during a resume operation are previously stored in cache 24 by I/O module 22. Thus during the resume operation, the disk access requests made by the system components will be filled via cache 24 rather than through actual hard disk drive accesses. Allowing requests to be filled from cache 24 rather than from hard disk drive 42 improves system speed during a resume operation.

3. Training Submodule

One embodiment of the present invention utilizes training submodule 70 (FIG. 1) to fill or generate resume table 60 of resume acceleration module 30 with a set of references to disk accesses likely to be made by system components during a resume operation.

In one embodiment of the present invention, training submodule 70 records in resume table 60 references to all disk accesses made during the last 10 resume operations.

Figure 5:
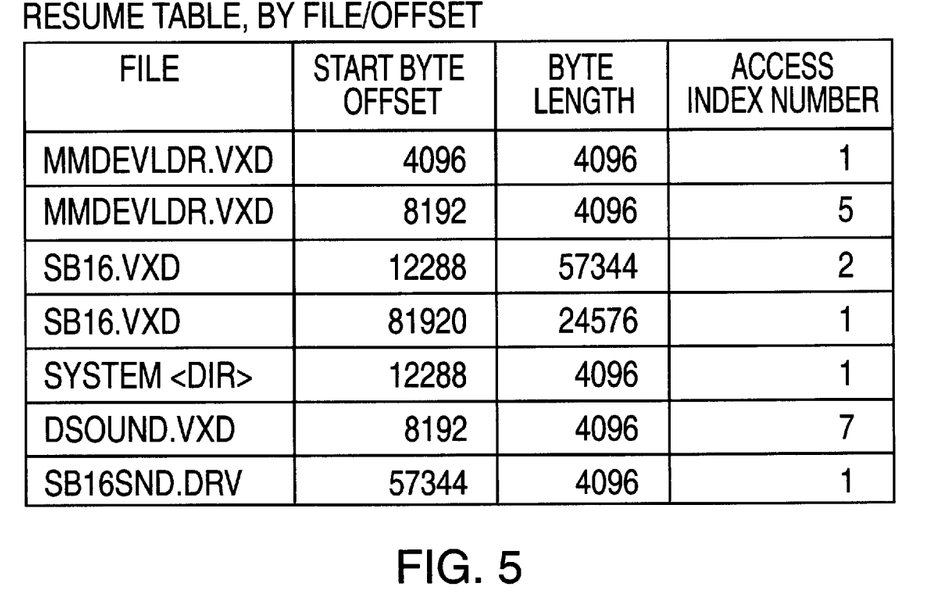
FIG. 5 illustrate resume table of FIG. 1 according to an embodiment of the present invention.

FIG. 5 illustrates resume table 60 of FIG. 1 according to an embodiment of the present invention. Each reference to a disk access is recorded in resume table 60 in the form of a filename (referencing a file on hard disk drive 42), a start byte offset (indicating the start of the data region requested within the file), and the byte length of the data region. Additional information will be recorded with each disk access reference, including, in one embodiment, information an access index number indicating how recently, in terms of resume operations, the particular reference was stored in resume table 60.

During each resume operation, the access index number for each disk access reference in resume table 60 is incremented. In addition, during each resume operation each newly entered disk access reference and each existing reference which is requested during the current resume operation has its corresponding access index number set to one. After each resume operation, disk access references having an access index number of greater than or equal to 10 are removed from resume table 60. While in one embodiment resume table 60 has no size limitations, resume table 60 should not grow to an unreasonable size, as the typical resume operation will require only a modest number of disk accesses, e.g. 100, most of these accesses are repeated over a series of resume operations, and references to disk accesses in resume table 60 that are not requested over the course of 10 resume operations are discarded. However, the system of the present invention may work with resume table 60 being any size. On a computer system with a typical configuration there is sufficient memory to handle resume table 60 having many more than 100 disk accesses. Training submodule 70 may use disk access reference retiring algorithms other than that described above, using access index numbers. For instance, each entry in resume table 60 may include information describing how many times the entry was referenced over a certain number of recent resume operations.

Figure 6:
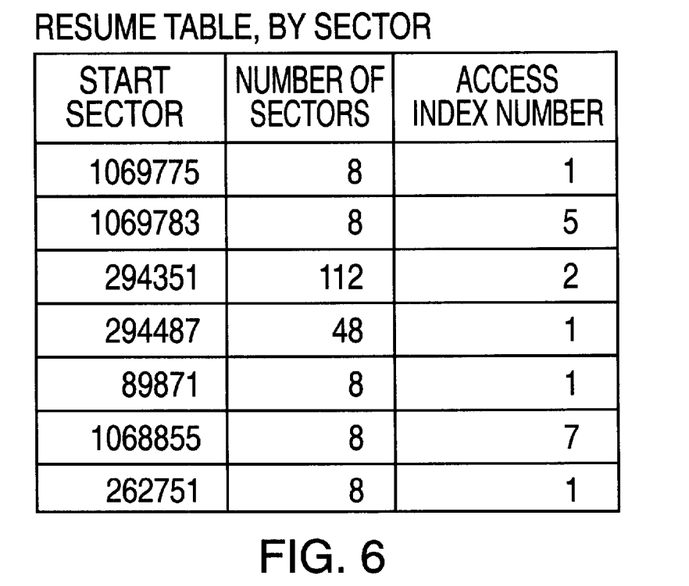
FIG. 6 illustrates the resume table of FIG. 1 according to another embodiment of the present invention.

While in one embodiment of the present invention references to disk accesses are stored in the form of a filename, offset and length, it should be apparent that any manner of description can be used to specify the references to the disk access—for example, accesses could be described in resume table 60 by start disk sector and number of sectors read, as shown in FIG. 6, which illustrates resume table 60 of FIG. 1 according to an embodiment of the present invention.

Training submodule 70, using tracer 80, records references to all hard disk access requests made by OS 20 and applications 30–33 during each resume operation. In an exemplary embodiment of the present invention training submodule 70 is active during a training period which lasts for 25 seconds beyond the first actual hard disk drive access occurring during the resume operation; this first access will not be able to occur until hard disk drive 42 rotates disk 50 at its operational speed. Training submodule 70, over a series of resume operations, stores in resume table 60 the references to the requests that have been made most often in past resume operations and which are thus most likely to be made in future resume operations.

In an exemplary embodiment training submodule 70 employs tracer 80, a component of resume acceleration module 30, to generate a list of references to hard disk accesses requested during a resume operation. Upon the invocation of resume acceleration module 30 tracer 80 registers with OS 20, indicating an interest in disk accesses; as a result information on disk access requests will be passed to tracer 80. During the training period, tracer 80 receives disk access information sent from OS 20. OS 20 sends disk access information continually, but tracer 80 processes this information only during the training period, as resume acceleration module 30 and thus tracer 80 will be inactive outside of the training period. Tracer 80 passes the disk trace information to training submodule 70 which records the information in resume table 60 in the proper format, along with an access index number. Since system modules with tracer capabilities already exist, for example as part of the Win32 Tracing Kit®, a component of the Intel® Performance Evaluation & Analysis Kit® (IPEAK®), an embodiment of the present invention leverages off already created modules. In another embodiment, tracer 80 may be a component installed separately from the resume acceleration module 30. In this manner the system of the present invention may leverage off an already installed component.

Figure 4:
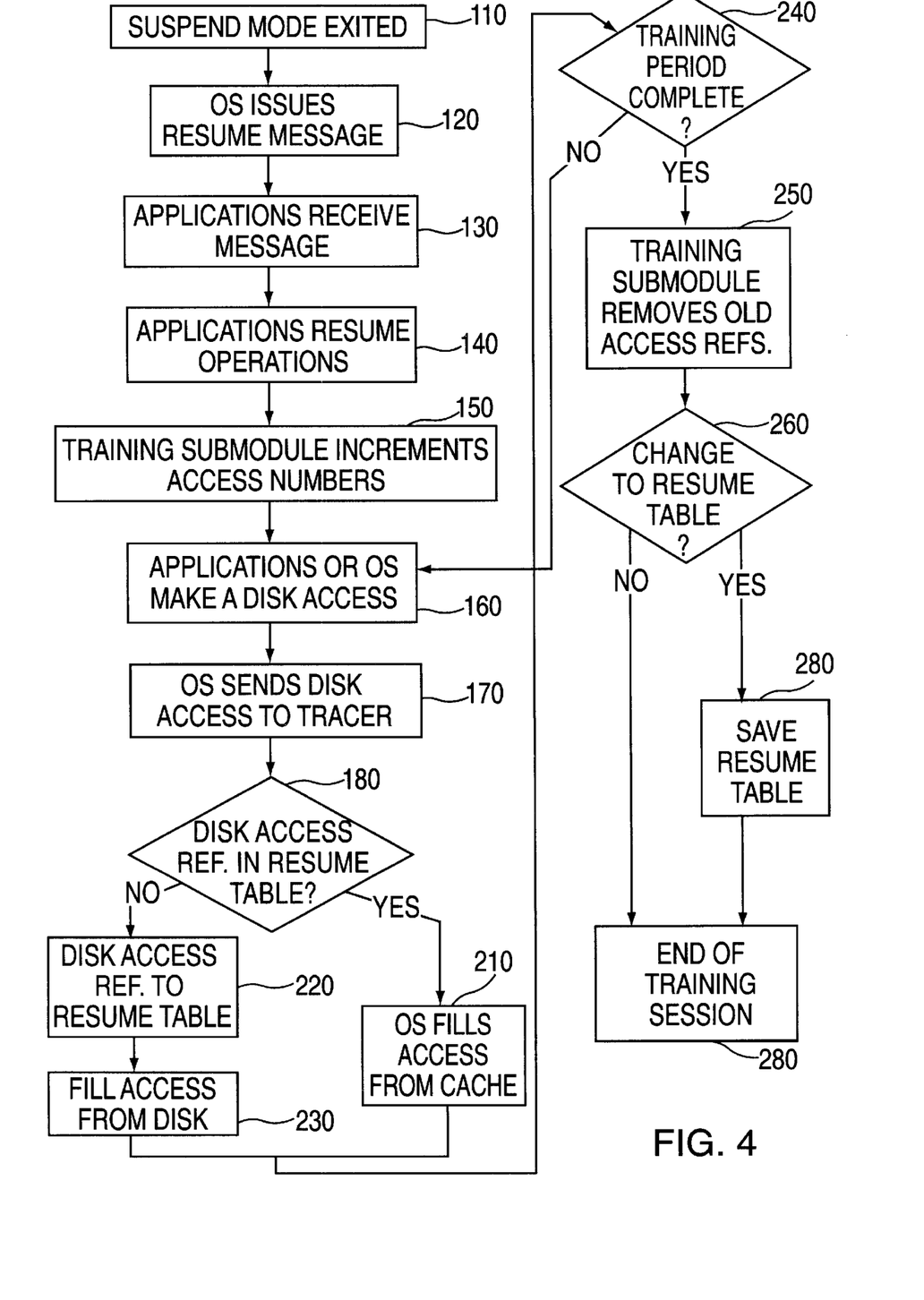
FIG. 4 is a flow chart illustrating the operation of the training submodule of FIG. 1 according to an embodiment of the present invention.

FIG. 4 is a flow chart illustrating the operation of training submodule 70 of FIG. 1 according to an embodiment of the present invention.

In step 110 of FIG. 4 an external event, such as a telephone call, or an internal event such as a timer expiration, has caused computer system 10 to exit the suspend state.

In step 120 OS 20 issues a resume message, which in one embodiment is a WM_POWERBROADCAST message with PBP_APMRESUMESUSPEND as one field. Other embodiments may employ different techniques to initiate a resume operation, not using a particular message, or not using messaging.

Applications 30–33 receive this message in step 130; in step 140, applications 30–33 (including training submodule 70) begin their resume operations.

In step 150, training submodule 70, (a part of resume acceleration module 30, an application which has received the resume message from OS 20), increments the access index number for all disk access references in resume table 60 as part of its resume operation. Other embodiments of the present invention may use methods other than the access index method to determine if access references should be discarded. Training submodule 70 will be active from the start of a resume operation for a training period. In an exemplary embodiment the training period lasts 25 seconds beyond the first actual hard disk drive access occurring during the resume operation. In other embodiments the training period lasts for a different amount of time after this disk access, lasts for a fixed amount of time, or is ended by an OS 20 signal or by other methods.

In step 160 an application 30–33 makes a disk access request to OS 20 or OS 20 makes a disk access as part of the re-initialization operation of a peripheral device 40–44; this disk access is handled by I/O module 22.

Information on this access request is sent to tracer 80 in step 170, which passes the information to training submodule 70.

In step 180, training submodule 70 checks the disk access reference against those existing in resume table 60.

If the disk access reference exists in resume table 60, suspend submodule 90, as discussed above, will have caused the hard disk data corresponding to this disk access to be stored in cache 24 during the preceding suspend operation; thus OS 20, as a normal course of its operations, will fill the request from cache 24 in step 210. In alternative embodiments a precise match need not be made; for instance suspend submodule 90 may check a portion of the disk access reference against portions of existing references. Filling this request from cache 24 will be much faster than filling the request from hard disk drive 42 during the resume period, when disk 50 is not yet rotating at its operational speed. Since an existing reference is being accessed, training submodule 70 sets the access index number of the entry for that disk access reference in resume table 60 to 1 to indicate the reference was recently accessed.

If the disk access reference does not exist in resume table 60, training submodule 70, in step 220, enters the reference to the disk access in resume table 60. In an exemplary embodiment of the present invention, a new entry in resume table 60 will have an access index number of 1, indicating a recent access.

Since if the reference to the disk access does not exist suspend submodule 90 will not have caused the hard disk data corresponding to the access to be loaded into cache 24, OS 20 will have to fill the request by an actual request to hard disk drive 42 in step 230. In an exemplary embodiment, when the training submodule 70 is first run on a particular system resume table 60 may be empty. In alternative embodiments resume table 60 may be pre-loaded.

In step 240 training submodule 70 determines if the training period is finished. In an exemplary embodiment, the period lasts for 25 seconds beyond the first actual hard disk drive access occurring during the resume operation. If this period has not elapsed training submodule 70 continues its operation and the system proceeds to step 160. In other embodiments, other methods may be used to determine that the training period has completed.

If the training period has elapsed, training submodule 70, in step 250, removes old access request references, which are less likely to be used in the future. In an exemplary embodiment, references having an access index number greater than or equal to 10 are removed.

In step 260 training submodule 70 determines if resume table 60 has changed during the current resume operation.

If it has, training submodule 70, in step 270, saves the new version of resume table 60 to hard disk drive 42. When resume acceleration module 30 is loaded suspend submodule 90 requires the latest version of resume table 60, stored on hard disk drive 42.

Training submodule 70 terminates its operations in step 280; however OS 20 or system applications 30–33 may continue their resume operations.

Several embodiments of the present invention are specifically illustrated and/or described herein. However, it will be appreciated that modifications and variations of the present invention are covered by the above teachings and are within the purview of the appended claims without departing from the spirit and intended scope of the invention.

For example, while the present invention has been described with respect to an embodiment where modules of the invention are partially or wholly separate from OS 20, an embodiment of the present invention may be implemented which is integrated into OS 20. In addition, system components other than the application programs 30–33 and OS 20 mentioned may be asked to suspend and resume their operations, may require hard disk data during a resume operation, and may utilize an embodiment of the present invention. In addition, in other embodiments of the present invention data may not be on a hard disk drive installed locally on computer system 10 but may be on a remote storage device. In alternative embodiments the operation of the suspend and resume functions may differ; for example different methods may be used to notify system components of an impending suspend operation, and different aspects of the computer system's state may be saved in RAM 540 or elsewhere on a suspend operation. Cache 24 may be the "file system cache" common to computer systems, or may be any other type of cache. In addition, the pre-loaded information may be stored elsewhere than a cache. Alternative embodiments of the present invention may fill resume table 60 by other means than training submodule 70, for example by providing a file references to likely disk accesses.

What is claimed is:

1. A method of executing a suspend operation and a resume operation of a computer system including a disk storing a plurality of blocks of data, comprising the steps of:

determining a set of disk accesses likely to be made during the resume operation, each of the disk accesses loading a corresponding block of data to a memory from the disk; and prior to the suspend operation, loading to the memory the corresponding blocks of data from the disk.

2. The method of claim 1 where, prior to the suspend operation, the determining step includes the substep of recording a set of disk accesses made during an at least one previous resume operation.

3. The method of claim 1 where the corresponding blocks of data are loaded into a cache.

4. The method of claim 3 where the determining step includes the substep of recording a set of disk accesses made during an at least one previous resume operation.

5. The method of claim 3 where:

the computer system includes an operating system; and during the resume operation, at least one block of the corresponding blocks of data are read from the cache by requesting from the operating system at least one of the set of disk accesses.

6. The method of claim 5 where, prior to the suspend operation, the corresponding blocks of data are loaded to the cache by making a set of requests to the operating system.

7. The method of claim 3 where:

the computer system includes an operating system; and prior to the suspend operation, the corresponding blocks of data are loaded to the cache by making a set of requests to the operating system.

8. The method of claim 1 where:

the computer system includes an at least one peripheral device; and the set of data enables the operation of the at least one peripheral device.

9. A method of executing a suspend operation and a resume operation of a computer system including a disk storing a plurality of blocks of data comprising the steps of:

prior to the suspend operation, loading a subset of the blocks of data from the disk into a cache; and during the resume operation, reading at least one of the subset of the blocks of data from the cache.

10. The method of claim 9 where:

the computer system includes an operating system; and the subset of the blocks of data are loaded to the cache by making a set of requests to the operating system.

11. The method of claim 10 further comprising the step of:

during an at least one previous resume operation selecting the subset of the blocks of data.

12. A computer system able to perform suspend and resume operations comprising:

a hard disk drive having blocks of data;

an operating system;

a modem interface; and a resume acceleration module determining a set of disk accesses likely to be made during the resume operation, each of the disk accesses loading a corresponding block of data from the hard disk drive to a memory, and prior to the suspend operation, loading the blocks of data from the disk to the memory.

13. The system of claim 12 further comprising a cache, where the corresponding blocks of data are loaded into the cache.

14. The system of claim 13 where the resume acceleration module determines the set of disk accesses by recording a set of disk accesses made during an at least one previous resume operation.

15. A computer system able to perform suspend and resume operations comprising:

a hard disk drive having blocks of data;

an operating system;

a network adapter; and a resume acceleration module determining a set of disk accesses likely to be made during the resume operation, each of the disk accesses loading a corresponding block of data from the hard disk drive to a memory, and prior to the suspend operation, loading the blocks of data from the disk to the memory.

16. The system of claim 15 further comprising a cache, where the corresponding blocks of data are loaded into the cache.

17. The system of claim 16 where the resume acceleration module determines the set of disk accesses by recording a set of disk accesses made during an at least one previous resume operation.

18. A system for executing a suspend operation and a resume operation on a computer system including a disk storing a plurality of blocks of data comprising:

a training module determining a set of disk accesses likely to be made during the resume operation, each of the disk accesses loading a corresponding block of data from the disk to a memory; and a suspend module loading the blocks of data from the disk to the memory prior to the suspend operation.

19. The system of claim 18 further comprising a cache, where the corresponding blocks of data are loaded into the cache.

20. The system of claim 19 where the training module determines the set of disk accesses by recording a set of disk accesses made during an at least one previous resume operation.

21. A program storage device readable by a computer system, storing a plurality of instructions for executing a suspend operation and a resume operation on a computer system including a disk storing a plurality of blocks of data, the plurality of instructions comprising:

instructions for determining a set of disk accesses likely to be made during the resume operation, each of the disk accesses loading a corresponding block of data from the disk to a memory; and instructions for loading the blocks of data from the disk to the memory prior to the suspend operation.

22. The device of claim 21 where the computer system further includes a cache, and where the corresponding blocks of data are loaded into the cache.

23. The device of claim 22 where the set of disk accesses are determined by recording a set of disk accesses made during an at least one previous resume operation.

* * * * *

UNITED STATES PATENT AND TRADEMARK OFFICE
CERTIFICATE OF CORRECTION

PATENT NO.   : 6,347,370 B1
DATED        : February 12, 2002
INVENTOR(S)  : Knut Stener Grimsrud It is certified that error appears in the above-identified patent and that said Letters Patent is hereby corrected as shown below:

Column 1,
Line 23, "dries" should be -- drives --

Column 2,
Line 40, "illustrate resume" should be -- illustrates the resume --

Signed and Sealed this

Eighteenth Day of February, 2003

JAMES E. ROGAN
*Director of the United States Patent and Trademark Office*